US009906601B2

(12) United States Patent
Zhang et al.

(10) Patent No.: US 9,906,601 B2
(45) Date of Patent: Feb. 27, 2018

(54) SYSTEM AND METHOD FOR SUPPORTING NAMESPACES IN A MULTITENANT APPLICATION SERVER ENVIRONMENT

(71) Applicant: ORACLE INTERNATIONAL CORPORATION, Redwood Shores, CA (US)

(72) Inventors: Leimeng Zhang, Beijing (CN); Guojun Shan, Beijing (CN); William Shannon, Los Altos, CA (US); Rajiv Mordani, Sunnyvale, CA (US); Lawrence Feigen, Watchung, NJ (US); Yun Lin, Beijing (CN); Chuntao Chen, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 330 days.

(21) Appl. No.: 14/799,250

(22) Filed: Jul. 14, 2015

(65) Prior Publication Data
US 2016/0014212 A1   Jan. 14, 2016

Related U.S. Application Data

(60) Provisional application No. 62/024,364, filed on Jul. 14, 2014.

(51) Int. Cl.
*H04L 29/08* (2006.01)
*G06F 9/50* (2006.01)

(52) U.S. Cl.
CPC .......... *H04L 67/141* (2013.01); *G06F 9/5077* (2013.01); *H04L 67/10* (2013.01); *H04L 67/34* (2013.01)

(58) Field of Classification Search
CPC ....... H04L 67/141; H04L 67/10; H04L 67/34; G06F 9/5077
See application file for complete search history.

(56) References Cited

U.S. PATENT DOCUMENTS

2002/0147696 A1* 10/2002 Acker .................... G06F 9/465
2003/0172145 A1*  9/2003 Nguyen ................. G06Q 10/10
                                                               709/223

(Continued)

OTHER PUBLICATIONS

IBM, Websphere Application Server V6.1: System Management and Configuration, 2006, pp. 741-794.*

(Continued)

*Primary Examiner* — Larry Donaghue
(74) *Attorney, Agent, or Firm* — Tucker Ellis LLP

(57) ABSTRACT

In accordance with an embodiment, described herein is a system and method for supporting namespaces in a multi-tenant application server environment. The application server environment can include a domain with a plurality of partitions. A global namespace or JNDI tree bound to domain-level resources can maintain a collection of partition root nodes, with each partition root node being the root node of a partition JNDI tree. Each node in a partition JNDI tree is made partition-aware by including properties specific to a particular partition. An initial context for a partition can be created for use in dispatching resource lookup requests to the partition, and can be reused by other applications in accessing resources in the partition.

20 Claims, 9 Drawing Sheets

(56) References Cited

U.S. PATENT DOCUMENTS

2007/0168371 A1* 7/2007 Bhogal ............... H04L 61/1582
2011/0213870 A1 9/2011 Cai
2012/0072597 A1 3/2012 Teather
2012/0110566 A1 5/2012 Park

OTHER PUBLICATIONS

Sun Microsystems, Inc., Java Naming and Directory Interface Application Programming Interface (JNDI API), Jul. 14, 1999, 76 pages.
International Searching Authority at the European Patent Office, International Search Report and Written Opinion for PCT International Application No. PCT/US2015/040407, Sep. 28, 2015, 10 pages.
International Searching Authority at the European Patent Office, International Search Report and Written Opinion for PCT International Application No. PCT/US2015/012268, dated Apr. 24, 2015, 10 pages.

* cited by examiner

US 9,906,601 B2

SYSTEM AND METHOD FOR SUPPORTING NAMESPACES IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled SYSTEM AND METHOD FOR SUPPORTING NAMESPACES IN A MULTI-TENANT SERVER APPLICATION ENVIRONMENT, Application No. 62/024,364, filed Jul. 14, 2014; and is related to U.S. patent application titled "SYSTEM AND METHOD FOR SUPPORTING MULTI-TENANCY IN A APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud platform environments, and are particularly related to a system and method for supporting namespaces in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for supporting namespaces in a multi-tenant application server environment. The application server environment can include a domain with a plurality of partitions. A global namespace or JNDI tree bound to domain-level resources can maintain a collection of partition root nodes, with each partition root node being the root node of a partition JNDI tree. Each node in a partition JNDI tree is made partition-aware by including properties specific to a particular partition. An initial context for a partition can be created for use in dispatching resource lookup requests to the partition, and can be reused by other applications in accessing resources in the partition.

DETAILED DESCRIPTION

In accordance with an embodiment, described herein is a system and method for supporting namespaces in a multi-tenant application server environment. The application server environment can include a domain with a plurality of partitions. A global namespace or JNDI tree bound to domain-level resources can maintain a collection of partition root nodes, with each partition root node being the root node of a partition JNDI tree. Each node in a partition JNDI tree is made partition-aware by including properties specific to a particular partition. An initial context for a partition can be created for use in dispatching resource lookup requests to the partition, and can be reused by other applications in accessing resources in the partition.

Application Server (e.g., Multi-Tenant, MT) Environment

Figure 1:
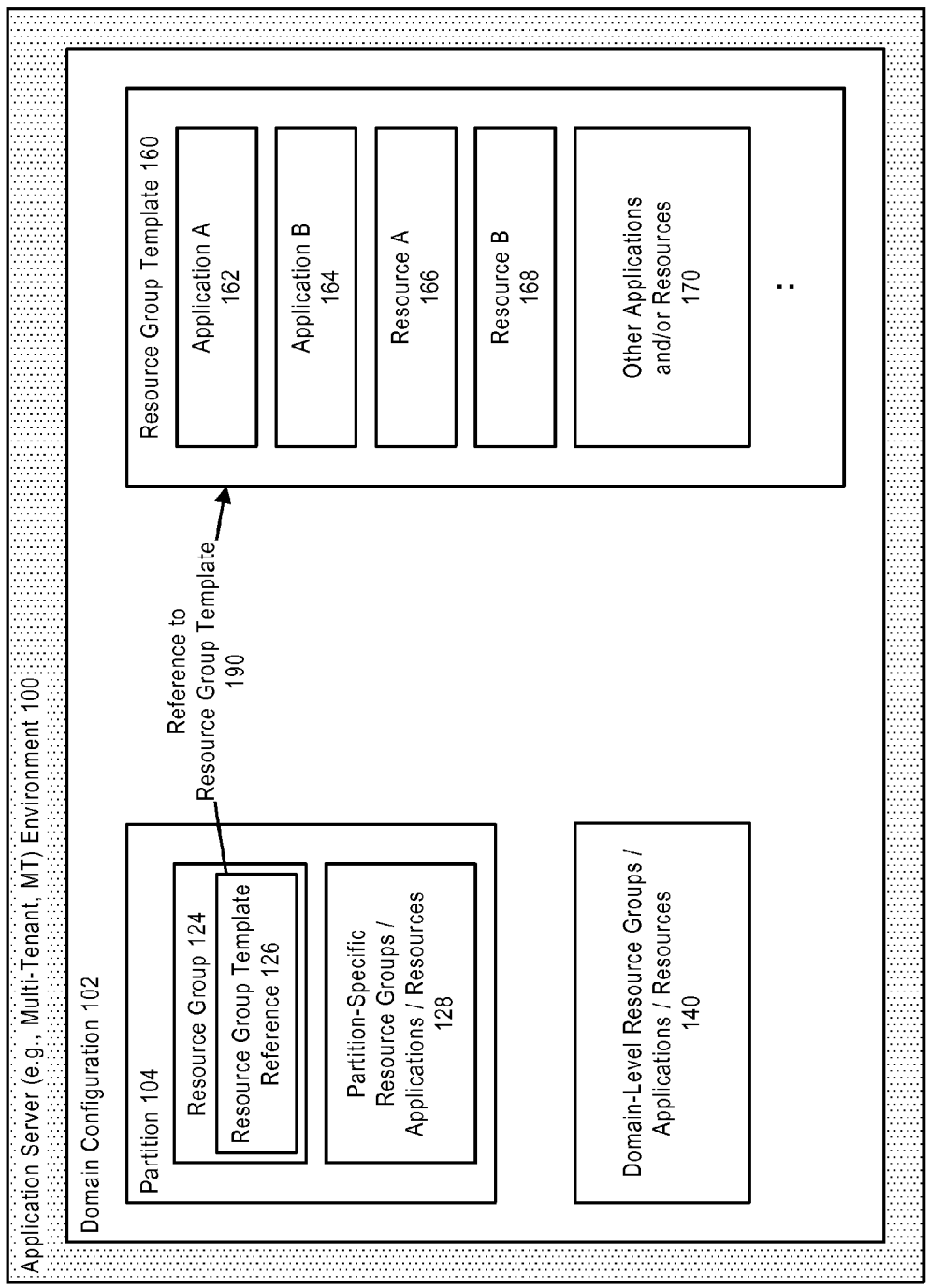
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
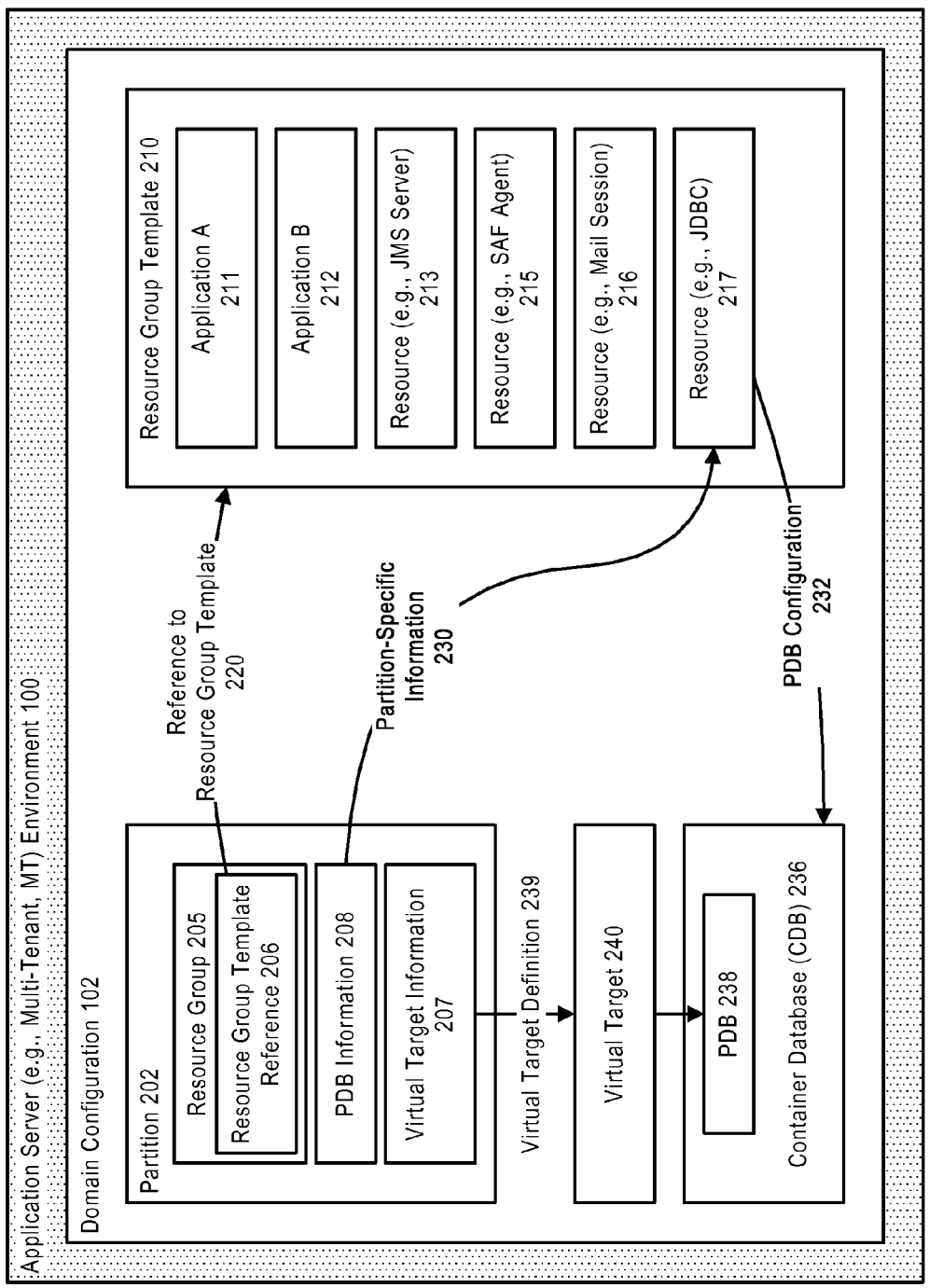
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
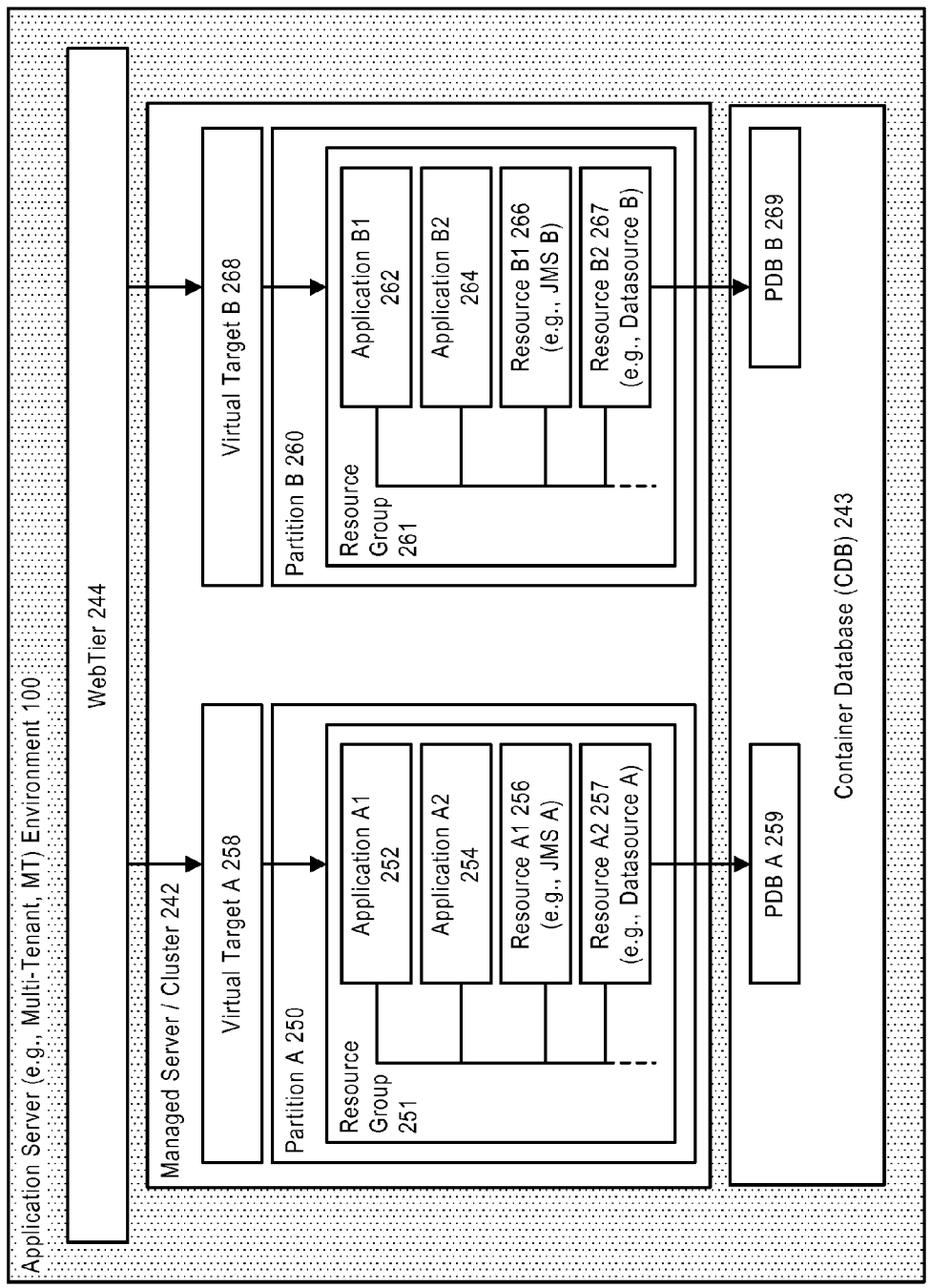
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain to be associated with a CDB, with each partition implicitly associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can reference one or more resource group templates. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure one or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
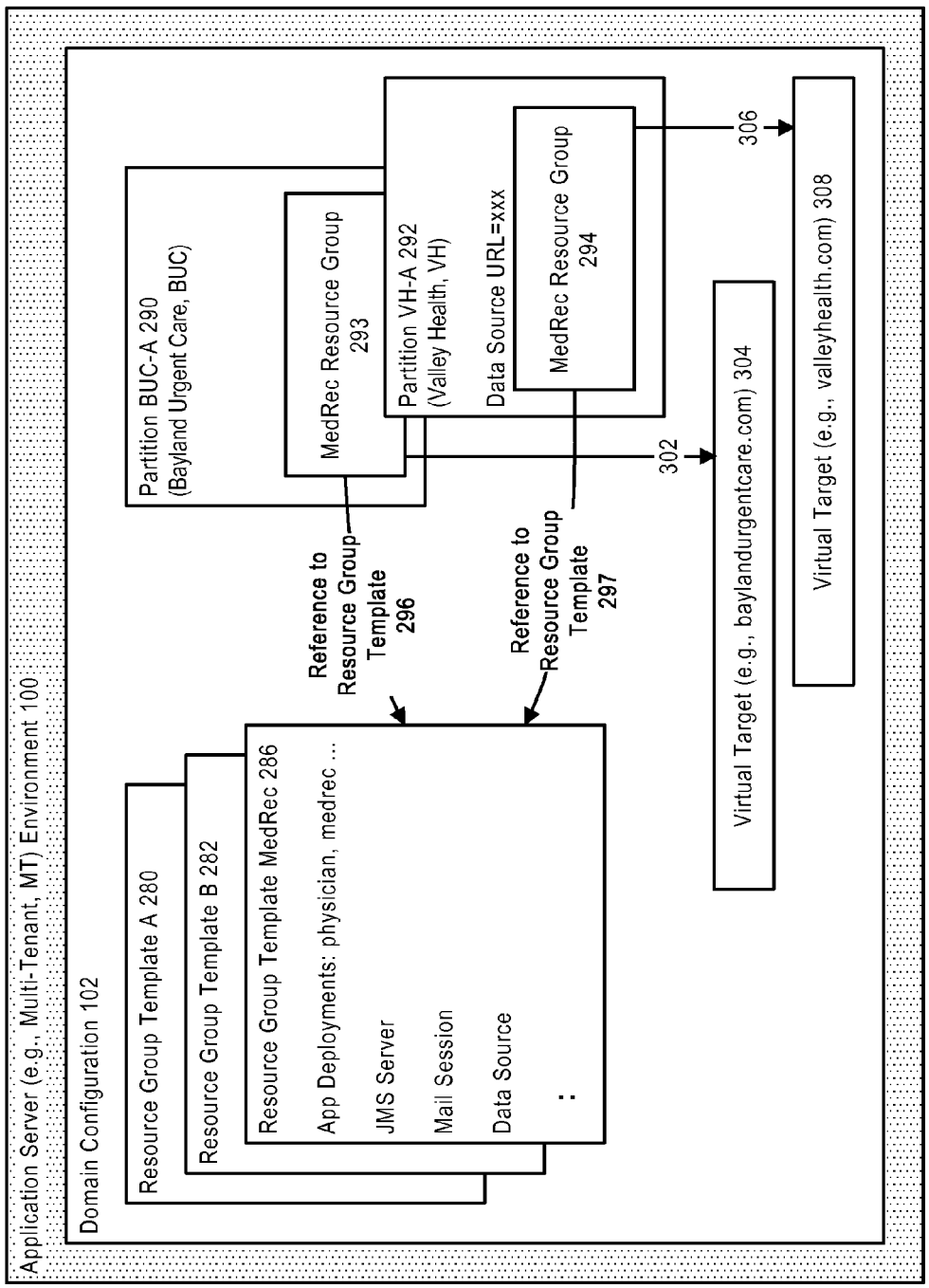
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
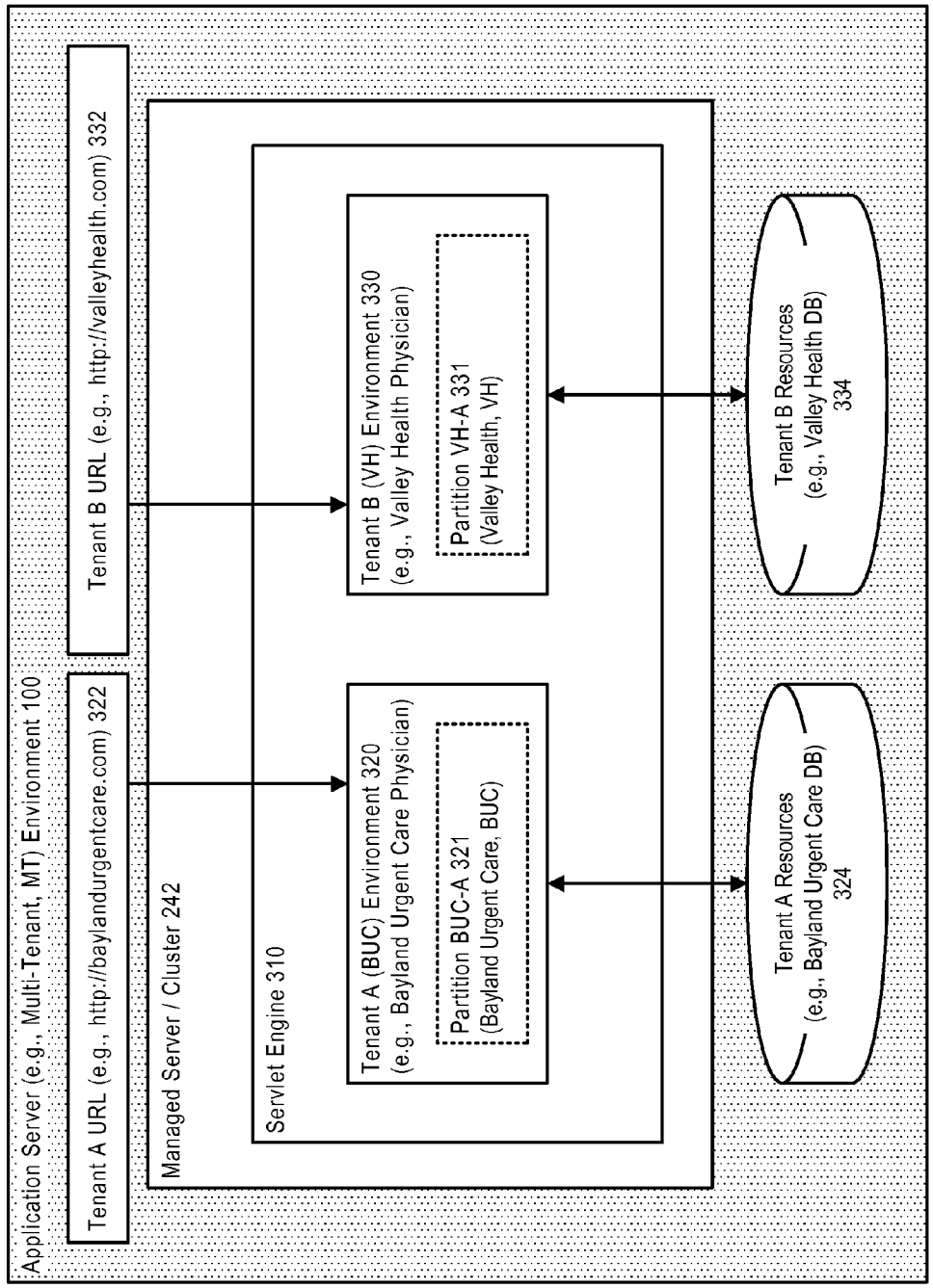
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Support for Multiple Partition JNDI Tree

An application server environment, for example, a multitenant, cloud or other environments, can include multiple partitions. A resource, for example a data source, a JMS or mail session, can be deployed in more than one partition.

Typically, a resource can include one or more objects that are mapped to a resource name via a naming service in an application server, so that when an application needs to access these objects, the application can locate the objects by the name of the resource.

In accordance with an embodiment, ideally a naming service is partition-aware and provides partition isolation within the naming service, to dispatch a resource lookup request to a particular partition.

In accordance with an embodiment, described herein is a system and method for supporting namespaces in a multi-tenant application server environment. The application server environment can include a domain with a plurality of partitions. A global namespace or JNDI tree bound to domain-level resources can maintain a collection of partition root nodes, with each partition root node being the root node of a partition JNDI tree. Each node in a partition JNDI tree is made partition-aware by including properties specific to a particular partition. An initial context for a partition can be created for use in dispatching resource lookup requests to the partition, and can be reused by other applications in accessing resources in the partition.

In accordance with an embodiment, the life-cycle of a partition JNDI tree is the same with that of its associated partition. When the partition is created, the partition JNDI tree can be created. Partition information, for example the partition name and partition ID, can be bound to the created partition JNDI tree. When the partition is destroyed, the partition JNDI tree for the partition is destroyed.

In accordance with an embodiment, each partition JNDI tree can be used by an application to access resources in an associated partition. The application can be one of a stand-alone application client of the domain, an application in a managed server in the domain, an application deployed within the partition, or an application deployed to a different partition.

When each of the above-described applications requests resources from a particular partition, that application can initiate a JNDI context associated with the partition, and use the JNDI context to delegate resource requests from the application to the partition JNDI tree.

In accordance with an embodiment, once created, the JNDI context can remain associated with the partition, so that all subsequent JNDI operations in the JNDI context can be delegated to the associated partition, and can be performed within the context of that partition. The JNDI context can be used by one or more applications on different threads from the thread used to create the JNDI context.

Figure 6:
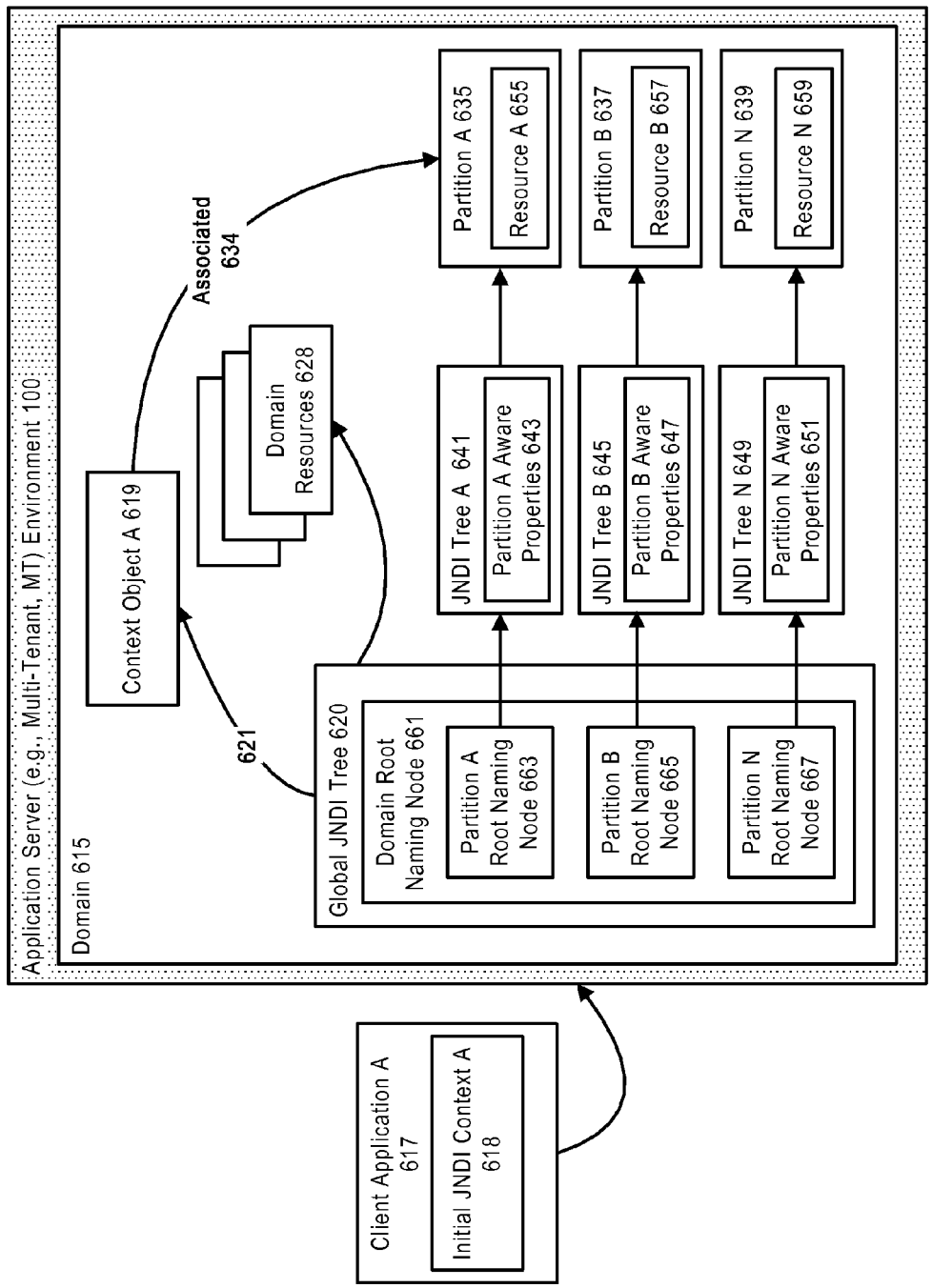
FIG. 6 illustrates a system for supporting multiple partition JNDI trees in a domain, in an application server environment, cloud or other environment, in accordance with an embodiment.

FIG. 6 illustrates a system for supporting multiple partition JNDI trees in a domain, in an application server environment, cloud or other environment, in accordance with an embodiment.

As shown in FIG. 6, a domain or global JNDI tree 620 can include a domain root naming node 661, which further includes a collection of partition root naming nodes, for example a partition A root naming nodes 663, a partition B root naming node 665, and a partition N root naming node 667. Each of the partition root naming nodes can be a root naming node for a partition JNDI tree, for example, a JNDI tree A 641, a JNDI tree B 645, and a JNDI tree N 649.

In accordance with an embodiment, the global JNDI tree is bound to domain-level resources 628. Each partition JNDI tree is associated with a partition (for example, a partition A 635, a partition B 637 or a partition C 639); and is bound to resources (for example, resource A 655, resource B 657 and resource N 659) deployed to that partition.

When an application needs to access a resource in a particular partition, the application can create an initial JNDI context as a starting point to a partition JNDI tree. Based on where the requesting application is located, a provider URL may be provided as a parameter for use in creating the initial JNDI context. If the requesting application is in the same partition as the requested resource, a provider URL is not needed. Otherwise, a provider URL needs to be provided; for example, when the requesting application is a client application to the application server domain.

As shown in FIG. 6, when a client application 617 needs to access a resource in the partition A, an initial JNDI context A 618 can be created with a provider URL specifying a partition.

Listing 1 illustrates an example of creating an initial JNDI context with a provider URL provided:

---
Listing 1
---
```
Hashtable h = new Hashtable( );
h.put(Context.INITIAL_CONTEXT_FACTORY,
"weblogic.jndi.WLInitialContextFactory");
h.put(Context.PROVIDER_URL, "t3://server-2:7001/partition-A");
h.put(Context.SECURITY_PRINCIPAL, "partition-A-user");
h.put(Context.SECURITY_CREDENTIALS, "partition-A-password");
Context ctx = null;
try {
    ctx = new InitialContext(h);
} catch (NamingException e) {
    e.printStackTrace( );
} finally {
    try {
        ctx.close( );
    } catch (NamingException e) {
        e.printStackTrace( );
    }
}
```
---

As shown above, Listing 1 illustrates an application that requests resources deployed in partition A and creates an initial JNDI context with a provider URL specifying that partition as a parameter.

In accordance with an embodiment, when a JNDI subsystem receives the requests to create an initial JNDI context, the JNDI subsystem can use the provider URL to associate the initial context with a partition as specified in the provider URL, for example by examining which partition root naming node includes information of the specified partition. If no provider URL is provided, the JNDI subsystem can associate the current component invocation context with the initial JNDI context. The current component invocation context can be associated with the current partition where the requesting application is running.

In accordance with an embodiment, once the initial JNDI context is created, JNDI operations initiated by the requesting application can be performed within the partition JNDI tree associated with the initial JNDI context. Requests from the initial JNDI context can be delegated to JNDI resources associated with the partition.

In addition, the initial context and the association 634 with the partition A can be maintained 621 as a context object A 619 in the domain for reuse by other applications.

Figure 7:
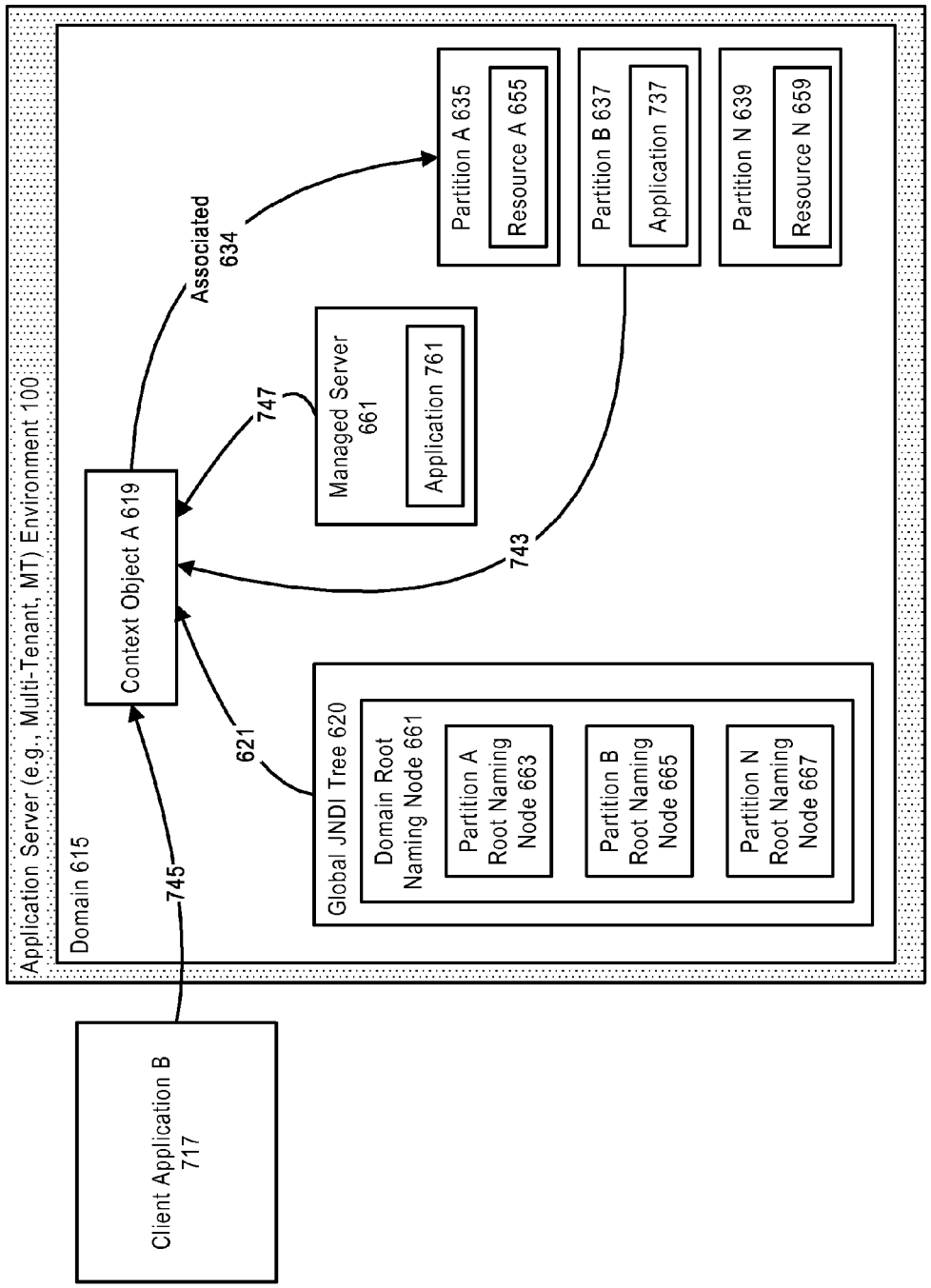
FIG. 7 further illustrates a system for supporting multiple partition JNDI trees in a domain, in an application server environment, cloud or other environment, in accordance with an embodiment.

FIG. 7 further illustrates a system for supporting multiple partition JNDI trees in a domain, in an application server environment, cloud or other environment, in accordance with an embodiment.

As shown in FIG. 7, the context object that has been created above can be maintained for reuse 743, 745, 747 by a plurality of applications, for example by a different client application B 717, an application 737 in the partition B, and an application 761 in a managed server in the domain.

In accordance with an embodiment, these applications, when accessing resources in the partition A, can call the context object. JNDI operations from these applications can be automatically delegated to the JNDI tree associated with the partition A; and be performed within the context of the partition A.

In accordance with an embodiment, the association between the context object and the partition can be maintained by associating the context object to a namespace of the partition. A plurality of callback functions can be provided in the JNDI subsystem to enable JNDI operations to be processed or performed in a component invocation context of the partition associated with the context object, instead of the current component invocation context.

Figure 8:
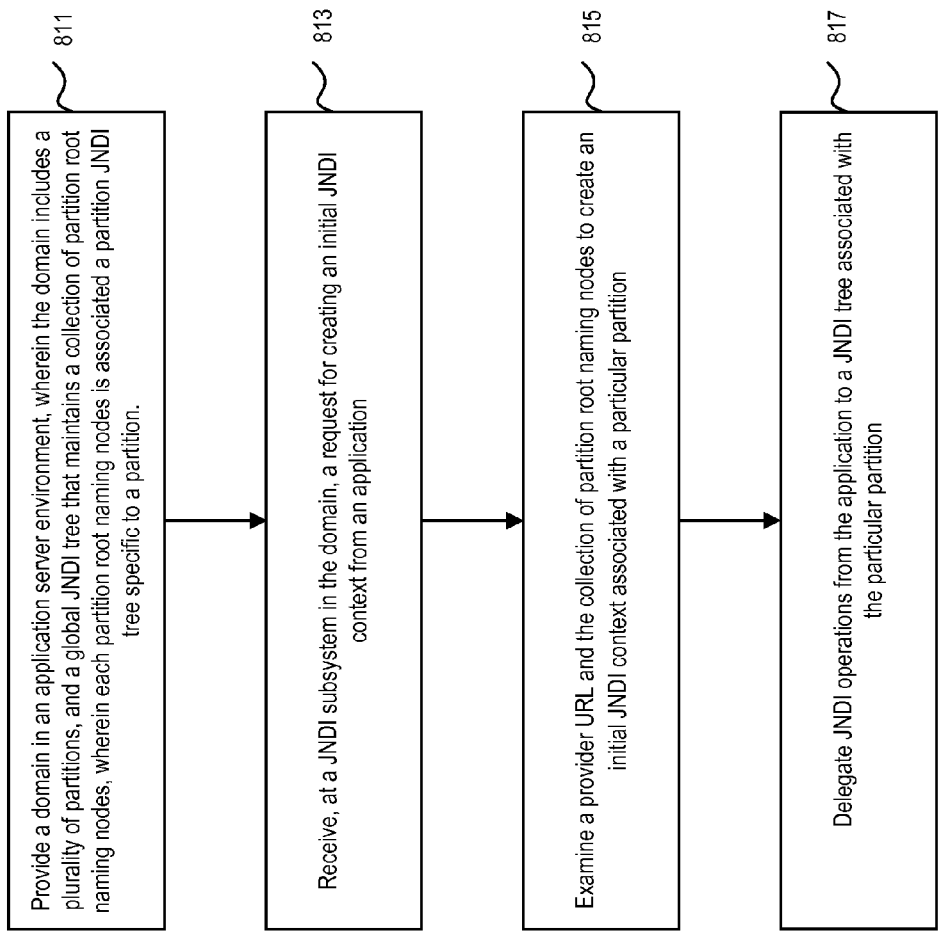
FIG. 8 illustrates a method for supporting multiple partition JNDI trees in a domain, in an application server environment, cloud or other environment, in accordance with an embodiment.

FIG. 8 illustrates a method for supporting multiple partition JNDI trees in a domain, in an application server environment, cloud or other environment, in accordance with an embodiment.

At step 811, a domain in an application server environment is provided, wherein the domain includes a plurality of partitions, and a global JNDI tree that maintains a collection of partition root naming nodes, wherein each partition root naming nodes is associated a partition JNDI tree specific to a partition.

At 813, a request for creating an initial JNDI context is received from an application at a JNDI subsystem in the domain.

At step 815, the JNDI subsystem examines information from the request and the collection of partition root naming nodes to create an initiate context associated with a particular partition.

At 817, JNDI operations from the application are delegated to a JNDI tree associated with the particular partition.

Figure 9:
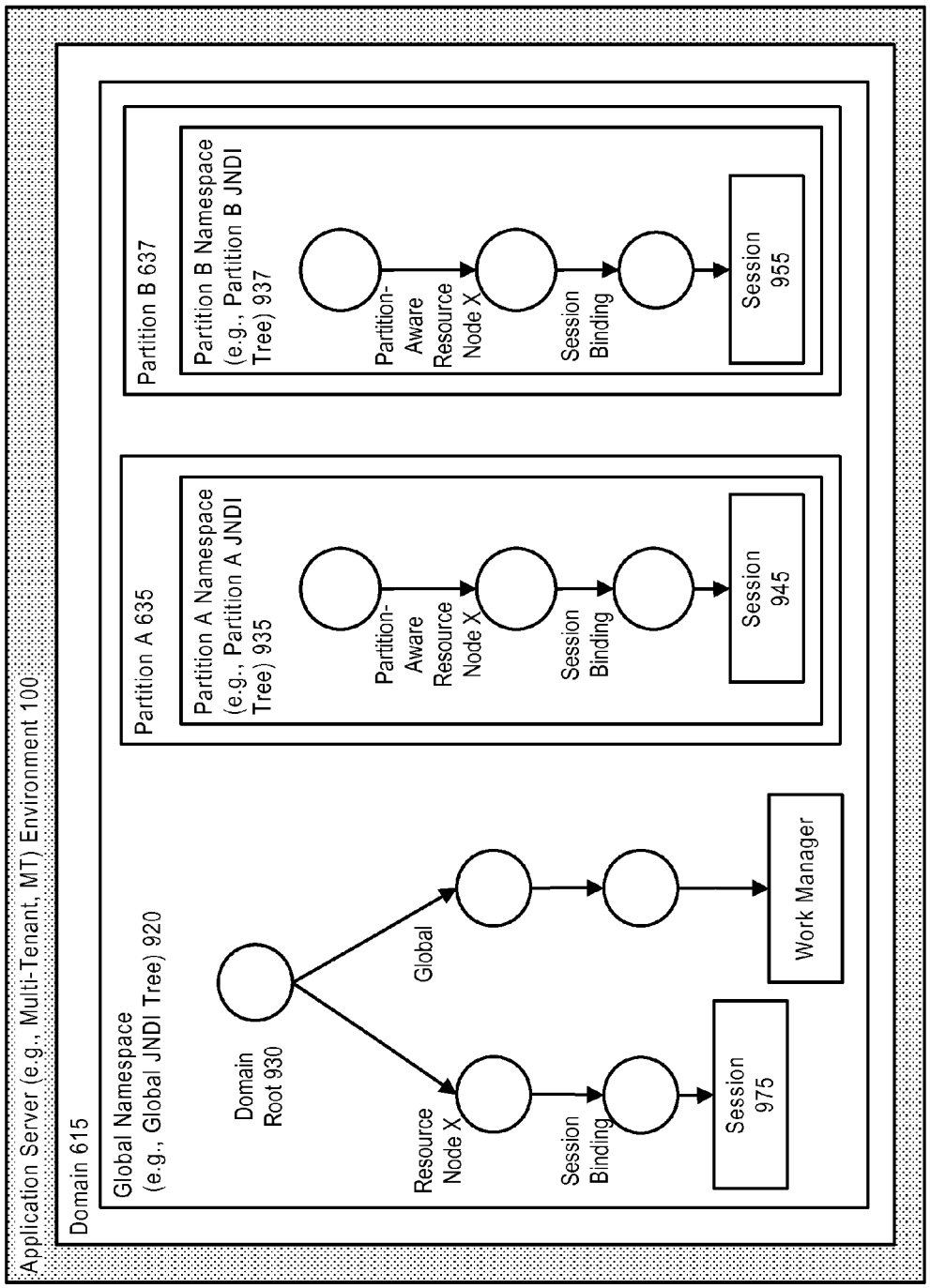
FIG. 9 illustrates an exemplary system for supporting multiple partition JNDI trees in a domain, in an application server environment, cloud or other environment, in accordance with an embodiment.

FIG. 9 illustrates an exemplary system for supporting multiple partition JNDI trees in a domain, in an application server environment, cloud or other environment, in accordance with an embodiment.

In accordance with an embodiment, the application server environment can perform partition-aware JNDI lookups and bindings for resources deployed in a partition. In such an environment, an application can only access JNDI resources in the scope of the partition where the application is deployed. For example, an application deployed in one partition cannot access JNDI resources of another partition or JNDI resources of the domain.

In accordance with an embodiment, the system can isolate JNDI resources by maintaining a collection of partition root naming nodes, with each partition root naming nodes associated with a partition name space (for example, a partition A namespace 935 and a partition B namespace 937)

In accordance with an embodiment, each node in a partition namespace (for example, a partition-level JNDI tree) can be made partition-aware by binding to one or more values specific to a partition. A same JNDI name can be bound to different namespaces for different partitions.

For example, a same JNDI resource (for example, a session resource) can be bound to the partition A namespace, the partition B namespace, and a global namespace 920. A JNDI lookup for the resource can be received from an application deployed within the partition A or the partition B. For the application deployed in the partition A, the session 945 can be returned. For the application deployed in the partition B, the session 955 can be returned.

In accordance with an embodiment, when a JNDI resource is not bound to a namespace of a partition, resource lookups received from an application deployed in the partition can generate an error, for example a NameNotFoundException.

As further shown in FIG. 9, the global namespace 920 can include a domain root node 930, and a plurality of resource nodes. The nodes in the global JNDI tree are not partition-aware, i.e., they are not bound to partition-specific information.

In accordance with an embodiment, a partition-aware naming node and a partition-unware node may have a same JNDI name (for example, the session node 975 in the global namespace and the session node 945 in the partition A namespace), but they can return different resources.

As such, partition-ware nodes provide enhanced lookup/bind/rebind/unbind functionalities to fulfil the requirements of a multitenant application server environment.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting multiple Java naming and directory interface (JNDI) trees in an application server environment, comprising:
   one or more computers, each including one or more microprocessors;
   an application server environment on the computers, wherein the application server environment includes
      a plurality of partitions in a domain, wherein each partition includes one or more resource groups, each resource group containing a reference to a resource group template that defines an application or a resource, and
      a global JNDI tree that maintains a collection of partition root naming nodes, wherein each partition naming nodes is associated with a partition JNDI tree;
   wherein the system, when receiving a request from an application for accessing the application or the resource in a particular partition, operates to
      create an initial JNDI context associated with the particular partition, and
      delegate JNDI operations from the application to a JNDI tree associated with the particular partition.

2. The system of claim 1, wherein the system further operates to examine information from the request and the collection of partition root naming nodes to identify the partition JNDI tree.

3. The system of claim 1, wherein the information from the request includes a provider URL that specifies information about the particular partition.

4. The system of the claim 1, wherein resources deployed in a partition are bound to an associated partition JNDI tree, wherein each node in the associated JNDI tree is partition-aware.

5. The system of claim 1, wherein the initial context, once created, is maintained as a context object for reuse by one or more other applications, wherein JNDI operations from the applications are directed to the partition associated with the context object.

6. The system of claim 5, the association between the context object and the partition is maintained by associating the context object with a name space of the partition.

7. The system of claim 5, wherein a plurality of callback functions are provided in the JNDI subsystem to enable the JNDI operations to be processed in a component invocation context of the partition.

8. A method system for supporting multiple Java naming and directory interface (JNDI) trees in an application server environment, comprising:
   configuring a domain in an application server environment, wherein the domain includes a plurality of partitions, and a global JNDI tree that maintains a collection of partition root naming nodes, wherein each partition includes one or more resource groups, each resource group containing a reference to a resource group template that defines an application or a resource, and wherein each partition root naming nodes is associated with a partition JNDI tree specific to a partition;
   receiving a request from an application for accessing the application or the resource in a particular partition;
   creating an initial JNDI context associated with the particular partition; and delegating JNDI operations from the application to a JNDI tree associated with the particular partition.

9. The method of claim 8, wherein the system further operates to examine information from the request and the collection of partition root naming nodes to identify the partition JNDI tree.

10. The method of claim 8, wherein the information from the request includes a provider URL that specifies information about the particular partition.

11. The method of the claim 8, wherein resources deployed in a partition are bound to an associated partition JNDI tree, wherein each node in the associated JNDI tree is partition-aware.

12. The method of claim 8, wherein the initial context, once created, is maintained as a context object for reuse by one or more other applications, wherein JNDI operations from the applications are directed to the partition associated with the context object.

13. The method of claim 12, the association between the context object and the partition is maintained by associating the context object to a name space of the partition.

14. The method of claim 12, wherein a plurality of callback functions are provided in the JNDI subsystem to enable the JNDI operations to be processed in a component invocation context of the partition.

15. A non-transitory computer readable storage medium including instructions stored thereon which, when read and executed by one or more computers, cause the one or more computers to perform the steps comprising:
configuring a domain in an application server environment, wherein the domain includes a plurality of partitions, and a global JNDI tree that maintains a collection of partition root naming nodes, wherein each partition includes one or more resource groups, each resource group containing a reference to a resource group template that defines an application or a resource, and wherein each partition root naming nodes is associated with a partition JNDI tree specific to a partition;
receiving a request from an application for accessing the application or the resource in a particular partition;
creating an initial JNDI context associated with the particular partition; and
delegating JNDI operations from the application to a JNDI tree associated with the particular partition.

16. The non-transitory computer readable storage medium of claim 15, wherein the system further operates to examine information from the request and the collection of partition root naming nodes to identify the partition JNDI tree.

17. The non-transitory computer readable storage medium of claim 15, wherein the information from the request includes a provider URL that specifies information about the particular partition.

18. The non-transitory computer readable storage medium of claim 15, wherein resources deployed in a partition are bound to an associated partition JNDI tree, wherein each node in the associated JNDI tree is partition-aware.

19. The non-transitory computer readable storage medium of claim 15, wherein the initial context, once created, is maintained as a context object for reuse by one or more other applications, wherein JNDI operations from the applications are directed to the partition associated with the context object.

20. The non-transitory computer readable storage medium of claim 19, the association between the context object and the partition is maintained by associating the context object to a name space of the partition.

* * * * *

UNITED STATES PATENT AND TRADEMARK OFFICE
CERTIFICATE OF CORRECTION

| | |
|---|---|
| PATENT NO. | : 9,906,601 B2 |
| APPLICATION NO. | : 14/799250 |
| DATED | : February 27, 2018 |
| INVENTOR(S) | : Zhang et al. |

It is certified that error appears in the above-identified patent and that said Letters Patent is hereby corrected as shown below:

In the Specification

In Column 11, Line 3, after "937)" insert -- . --.

Signed and Sealed this
Twenty-eighth Day of August, 2018

Andrei Iancu
*Director of the United States Patent and Trademark Office*